(12) United States Patent
Flores et al.

(10) Patent No.: US 7,490,045 B1
(45) Date of Patent: Feb. 10, 2009

(54) AUTOMATIC COLLECTION AND UPDATING OF APPLICATION USAGE

(75) Inventors: Roger Flores, Redwood City, CA (US); Ben Bostwick, Redwood City, CA (US)

(73) Assignee: PalmSource, Inc., Sunnyvale, CA (US)

( * ) Notice: Subject to any disclaimer, the term of this patent is extended or adjusted under 35 U.S.C. 154(b) by 863 days.

(21) Appl. No.: 09/874,717

(22) Filed: Jun. 4, 2001

(51) Int. Cl.
  *G01R 21/00* (2006.01)
  *G06F 19/00* (2006.01)
(52) U.S. Cl. .............................. 705/1; 702/62; 702/63
(58) Field of Classification Search .................. 705/10; 702/61–63
  See application file for complete search history.

(56) References Cited

U.S. PATENT DOCUMENTS

| | | | | |
|---|---|---|---|---|
| 5,623,647 | A * | 4/1997 | Maitra ......................... | 713/501 |
| 6,000,000 | A * | 12/1999 | Hawkins et al. ............. | 707/201 |
| 6,308,201 | B1 * | 10/2001 | Pivowar et al. .............. | 709/214 |
| 6,381,632 | B1 * | 4/2002 | Lowell ......................... | 709/203 |
| 6,745,011 | B1 * | 6/2004 | Hendrickson et al. ..... | 455/67.11 |
| 6,832,250 | B1 * | 12/2004 | Coons et al. ................. | 709/224 |
| 2001/0054026 | A1 * | 12/2001 | Choate ......................... | 705/52 |

OTHER PUBLICATIONS

Qualcomm pdQ™ 80 Dual Mode CDMA Digital and Analog Smartphone Spec Sheet (Feb. 19, 1999).*
http://benc.hr/appusage.htm (web page from Mar. 3, 2000 and Feb. 29, 2000)—Describes Benc's Application Usage Hack Program.*
http://homepage1.nifty.com/abby/PalmTech/Watcha2e/Watch-Ya2.html (web page dated Sep. 18, 2000)—Describes Watch-Ya! Application.*
Citrix Systems, Inc. "Citrix Resource Management Services Administrator's Guide," Published by Citrix Systems 1999 (http://www.dabcc.com/thinsol/rms/docs/manual.pdf).*
Hilbert, D.M. "Agents For Collecting Application Usage Over The Internet" Technical Report UCI-ICS-97-41, Department of Information and Computer Science, University of California, Irvine, Oct. 1997. (http://www.ics.uci.edu/~dhilbert/papers/).*
Orfali, R. "Client/Server Survival Guide 3$^{rd}$ Edition" Published in 1999 by John Wiley & Sons, ISBN 0-471-31615-6.*
Santos, P.J. "Automatic Chunk Detection In Human-Computer Interaction", Proceedings of The Workshop On Advanced Visual Interfaces; ISBN:0-89791-733-2 (1994) p. 69-77.*
Stemm et al. "Measuring and Reducing Energy Consumption of Network Interfaces in Hand-Held Devices." IEICE Transactions on Communications, vol. E80-B, No. 8, pp. 1125-1131, Aug. 1, 1997.*

* cited by examiner

*Primary Examiner*—Susanna M Diaz
(74) *Attorney, Agent, or Firm*—Berry & Associates P.C.

(57) ABSTRACT

A method and system providing automatic collection and updating of application usage on large number of electronic devices without user intervention. The electronic devices may be palm-sized computer systems, personal digital assistants (PDAs), or wireless telephones. On an electronic device, application usage statistics, for example, the number of times a user uses an application, are gathered and stored. Once gathered and stored, the usage statistics are transferred to a host computer, and subsequently to a server (alternatively, the electronic device can send the gathered statistics directly to a server). The server tabulates usage statistics gathered from a plurality of electronic devices and publishes the results. The users of the electronic devices that gather usage statistics can be compensated in a variety of ways (e.g., monetary, chances in a raffle, discounts on purchases etc.).

28 Claims, 16 Drawing Sheets

APP INFO BLOCK 940

| MONITOR | 1 BYTE |
|---|---|
| UserID | 8 BYTES |
| User Name | 21 BYTES |
| User email | 41 BYTES |

FIGURE 12A

| USAGE RECORD HEADER STRUCTURE 900 | |
|---|---|
| DATA STRUCTURE COUNT | 2 BYTES |
| DATE | 2 BYTES |
| DATA STRUCTURE TYPE INDICATOR | 2 BYTES |
| ARRAY OF DATA STRUCTURES | ... BYTES |

FIGURE 12B

USAGE APPLICATION DATA STRUCTURE 920

| CREATOR CODE | 4 BYTES |
|---|---|
| TIME SPENT (seconds) | 4 BYTES |
| COUNT | 2 BYTES |

AUTOMATIC COLLECTION AND UPDATING OF APPLICATION USAGE

BACKGROUND OF THE INVENTION

1. Field of the Invention

The present invention relates to the field of automatic collection, aggregating, and updating of application usage. More specifically, embodiments of the present invention relate to collecting and distributing statistics of application usage in a set of an electronic devices, e.g., computer systems, portable computer systems, palmtop computer systems, or any other hand-held electronic devices that utilize a display screen, such as cell phones, pagers, etc.

2. Related Art

As the components required to build a computer system have reduced in size, new categories of electronic devices and computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer (calendar, datebook, etc.) and electronic notepads, to name a few. Palmtop computers with PIM software have been known as Personal Digital Assistants (PDAs). Many PDAs have a small and flat display screen associated therewith.

In addition to PDAs, other portable electronic devices have display screens, such as cell phones, electronic pagers, remote control devices and other wireless portable devices. All of these devices have been adapted to display short lists of information on the display screens to help the user organize and display information, e.g., phone records.

User convenience is a very important factor for portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the user's everyday activities. Hence, applications need to be as easy to use as possible. Applications can be as simple as a single self-contained program, or as complex as a set of programs working together, making use of APIs, accessing data over the Internet, downloading and running applets from the Internet, and sharing computational and storage resources with other computing devices.

As larger numbers of applications (equivalently called application programs) are written for portable electronic devices, it becomes increasingly important for a system to be implemented that enables users to quickly and easily find the right, or best, applications for their needs. The present invention helps users find the most popular applications by tracking the actual usage of applications on a large number of devices. One goal of the present invention is to accomplish this task as simply and unobtrusively as possible.

Currently, web sites offering software downloads list popular applications grouped by number of downloads or user feedback. These statistics are not always an accurate indication of the usefulness of a particular program. Many programs are downloaded and used for only a brief time. Only a small percentage of users who do download an application take the time to write a comment. An objective of the present patent is to provide more accurate application information to users and developers by using actual usage statistics to track the popularity of applications.

One area of prior art in the area of application usage monitoring are the process monitoring tools that come standard with operating systems. These include the "ps" command in Unix and the "Task Manager" in Microsoft Windows operating systems. Both of these tools give the user the present status of processes and/or applications running on the computer system, showing parameters such as: percentage of CPU usage; percent of memory usage; total CPU time; and actual memory usage. These tools measure usage for only the applications that are currently running, and stop measuring an application's usage when the application stops running, and does not store any usage statistics. Hence, these tools do not accumulate usage data over time for a particular computer, nor do they accumulate usage data over many computers.

Another prior art usage monitor is "Watcha!", a software that runs on the palmtop computer from Palm Inc., and monitors application usage in terms of duration and battery usage. The "Watcha!" software collects this data for the user of the palmtop computer and has no facility for having a server collect data from a plurality of palmtop computers, nor does it have any means for sharing the data with other computing devices.

Another prior art usage monitor is "Application Usage Hack", a software which monitors application usage for a palmtop computer in terms of count and duration, and can upload the collected data to a host computer in the form of a CVS file. Once in the host computer, the user can translate the CVS file into other formats, including spreadsheets. The overall process of collecting usage data on the host computer requires the user to manipulate the data. Hence, the tabulation of data is not automatic. Also, there is no provision for sharing the data with a server in order to accumulate data from a plurality of electronic devices.

Another prior art usage monitor is "WorldCharts", a service that tracks the popularity of applications and various types of content (i.e., music and movies). However, it relies on users sending votes via email or entering them on a web page. Hence, this software is not automatic, requiring lots of user intervention. Overall results are based on ratings from users, rather than from actual usage data, making the results very subjective.

These prior art usage monitors suffer from many deficiencies, and these deficiencies are addressed in the present invention.

SUMMARY OF THE INVENTION

Accordingly, embodiments of the present invention provide a system having a mechanism for automatic collection and updating of application usage on a large number of electronic devices without user intervention. Therefore, the present invention allows users to transparently participate in an application usage rating system. In other words, an electronic device gathers usage statistics as a user interacts with his electronic device, and transmits the gathered usage statistics to a server without direction from the user. The server tabulates results from a plurality of electronic devices, and makes the results available to users, developers, and other interested parties. The Internet can be used to make to results available to a wide audience.

On an electronic device, application usage statistics are gathered and stored. Usage statistics include: number of times an application is run (alternatively, successfully completed); amount of time an application is used (taking into account factors such as alarms, cradle time, and auto-shutdown); and number of operations completed by the user for an application (e.g., number of clicks, number of records accessed, number of email received, number of times a particular feature is used, etc.). The gathered statistics are transferred to a host computer, and subsequently to a server (alternatively, the electronic device can send the gathered statistics directly to a server). The server tabulates usage statistics from a plurality of electronic devices and published the results. The users of the electronic devices that gather usage statistics can be compensated in a variety of ways (e.g., monetary, chances in a raffle, discounts on purchases).

The invention provides benefits to the developers of applications for electronic devices by supplying an objective means of measuring competing applications' popularity. More popular applications may have important features and/or price point, and developers of less popular applications can use this as a guide for future development.

The invention has many advantages for the user of an electronic device. For example, it helps the user determine which applications are most important to him, and thereby, which application should be upgraded, registered, augmented, or deleted. The providing of usage feedback to application developers helps users because developers can provide better products that match users' needs. Users also benefit if they receive compensation (e.g., monetary, chances in a lottery, product discounts) for supplying usage statistics, even though they do not need to spend their time to send the data; it happens transparently to the users.

The invention has an important benefit to developers of electronic devices in that the invention's use tells them which applications are most important to their user community, and thereby tells them which applications need to be compatible or ported to new versions of the electronic devices.

Embodiments include the above and further comprise the steps of: a) the electronic device gathering usage statistics of the application programs; b) the electronic device storing the usage statistics, the usage statistics comprising: duration of usage since last said transmitting step occurred, number of times used since last said transmitting step occurred, total duration usage; and, total number of times used; c) the electronic device displaying some of the stored usage statistics; d) the electronic device transmitting the stored usage statistics to a host computer; e) the host computer transmitting the stored usage statistics to a server; f) the server tabulating the usage statistics from a plurality of electronic devices, the tabulation possibly taking the form of storing the usage statistics into a database or updating the records of a database; g) publishing the results of the tabulation, which in one embodiment comprises: receiving a query request; applying said query to said database; receiving query results from said database; formatting said results; and transmitting said formatted results; and h) crediting value to accounts corresponding electronic devices that transmitted usage statistics The present invention provides these advantages and embodiments, plus others not specifically mentioned above but described in the sections to follow.

BRIEF DESCRIPTION OF THE DRAWINGS

FIG. 12A is an embodiment of a data structure, App Info Block, used to store information identifying the portable electronic device 100.

FIG. 12B is an embodiment of a data structure, Usage Record Header Structure, used as the first part of the total usage list and the recent usage list.

FIG. 12C is an embodiment of a data structure, Usage Application Data Structure, used to store application usage data in the total usage list and the recent usage list.

DETAILED DESCRIPTION OF THE INVENTION

Figure 1:
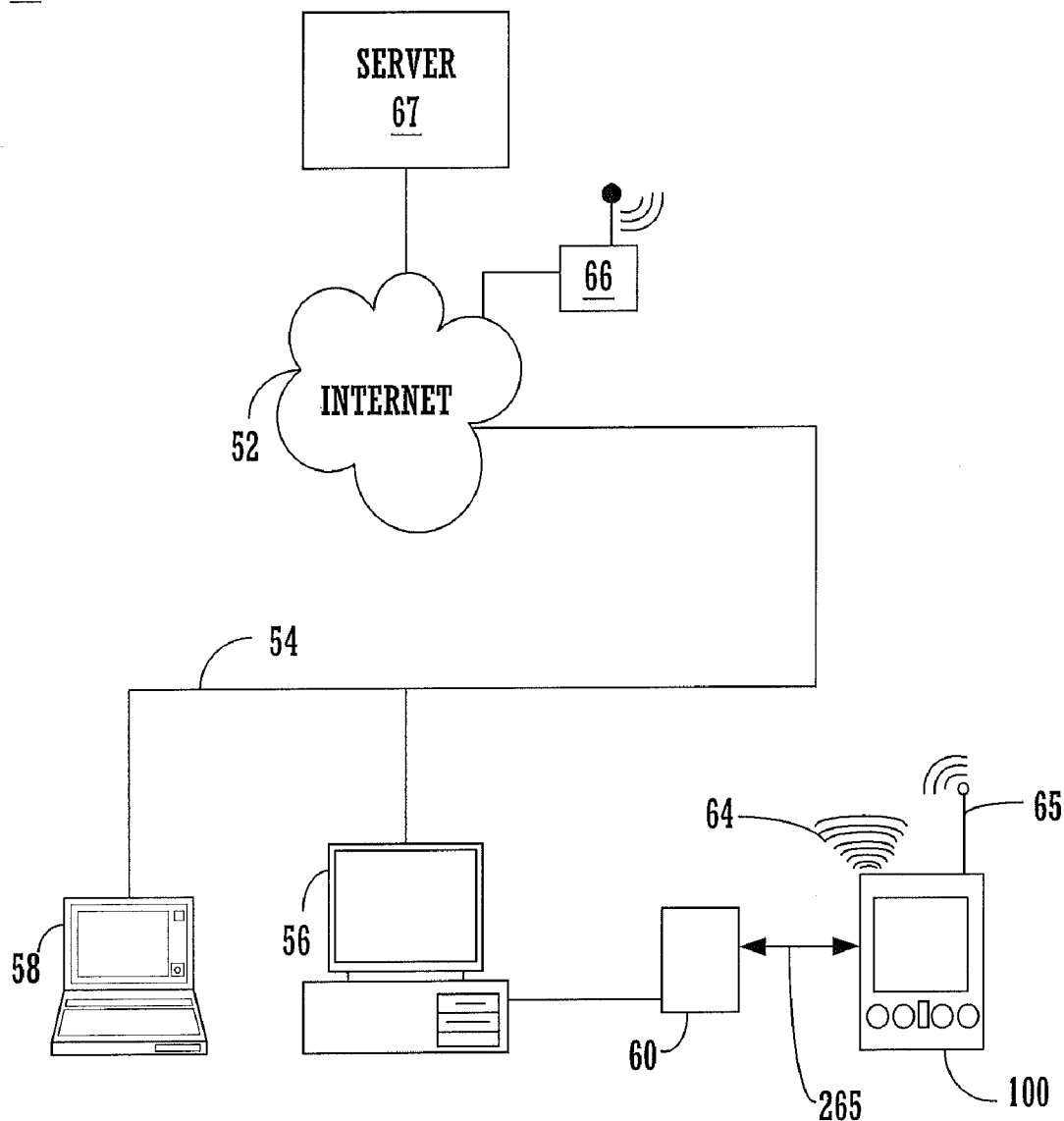
FIG. 1 is system illustration of a palmtop or "palm sized" computer system connected to other computer systems and the Internet via a cradle device.

In the following detailed description of the present invention, automatic collection and updating of application usage, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow (e.g., process 320 and process 420) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "accessing" or "processing" or "computing" or "suspending" or "resuming" or "translating" or "calculating" or "determining" or "scrolling" or "displaying" or "recognizing" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The processes of the present invention described herein are particularly applicable to portable electronic devices that have display screens and that download and run applications. These devices include, for instance, cell phones, pagers and portable computer systems. Although applicable across a wide variety of platforms and devices, the present invention is described herein by example with respect to a portable computer system.

FIG. 1 illustrates an exemplary networked system 50 that can be used in conjunction with an embodiment of the present invention. System 50 is exemplary only and comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 (or a separate communication channel) can provide communication with the Internet 52 using a number of well known protocols. Attached to the Internet 52 is a computer server 67 with which the portable computer system 100 and the host computer systems 56 and 58 can communicate. Also shown is an antenna 65 connected to the portable computer system for communicating over a wireless network connection to the Internet 52 via a transmitter 66.

Importantly, bus 54 is also coupled to a cradle 60 (or cable dock) for receiving and initiating communication with an exemplary palmtop ("palm-sized") portable computer system 100. Cradle 60 provides an electrical and mechanical communication interface between bus 54 (and anything coupled to bus 54) and the computer system 100 for two way communications. Computer system 100 may also contain a wireless infrared communication mechanism 64 for sending and receiving information to or from other devices.

Figure 2A:
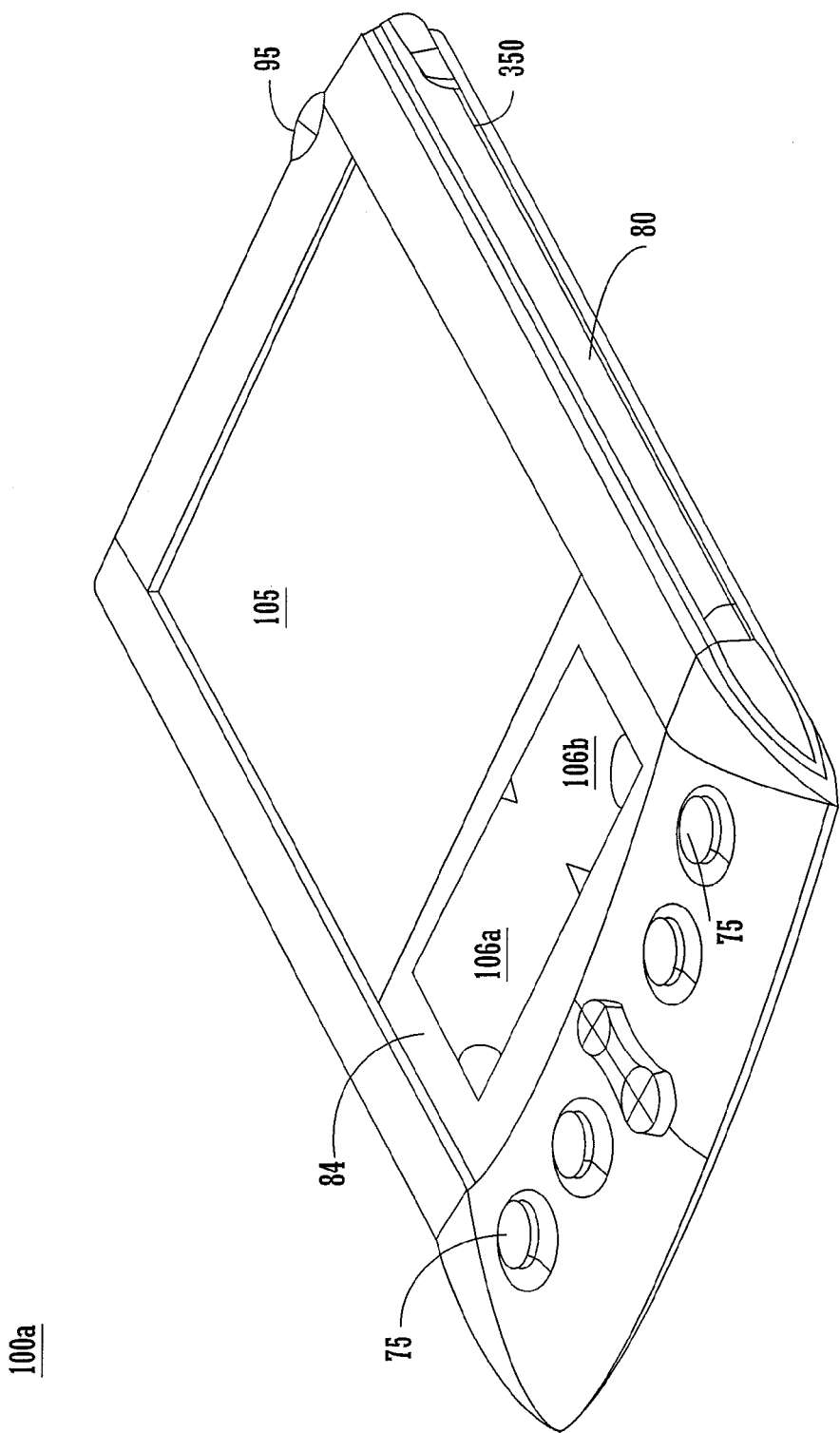
FIG. 2A is a top side perspective view of a palmtop computer system that can be used in one embodiment of the present invention.

FIG. 2A is a perspective illustration of the top face 100*a* of one embodiment of the palmtop computer system. The top face 110*a* contains a display screen 105 surrounded by a bezel or cover. A removable stylus 80 is also shown. The display screen 105 contains a transparent touch screen (digitizer) able to register contact between the screen and the tip of the stylus 80. The stylus 80 can be of any material to make contact with the screen 105. As shown in FIG. 2A, the stylus 80 is inserted into a receiving slot or rail 350. Slot or rail 350 acts to hold the stylus when the computer system 100*a* is not in use. Slot or rail 350 may contain switching devices for automatically powering down and automatically power up computer system 100*a* based on the position of the stylus 80. The top face 100*a* also contains one or more dedicated and/or programmable buttons 75 for selecting information and causing the computer system to implement functions. Other buttons (icons) can be implemented within a silk screen layer material 84 on which regions 106*a* and 106*b* reside. The on/off button 95 is also shown.

FIG. 2A also illustrates a handwriting recognition pad or "digitizer" containing two regions 106*a* and 106*b*. Region 106*a* is for the drawing of alpha characters therein for automatic recognition (and generally not used for recognizing numeric characters) and region 106*b* is for the drawing of numeric characters therein for automatic recognition (and generally not used for recognizing numeric characters). The stylus 80 is used for stroking a character within one of the regions 106*a* and 106*b*. The stroke information is then fed to an internal processor for automatic character recognition. Once characters are recognized, they are typically displayed on the screen 105 for verification and/or modification.

Figure 4:
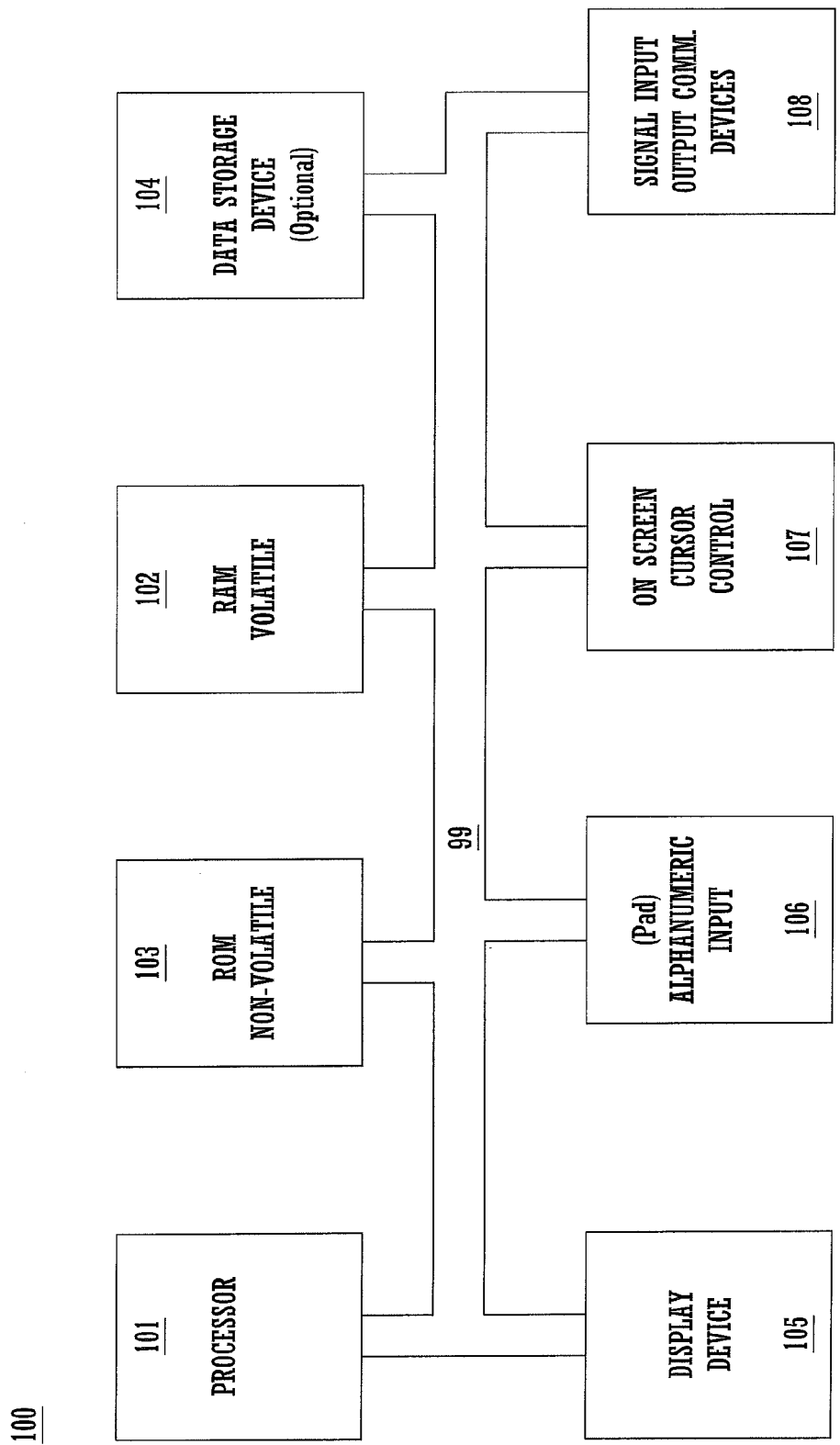
FIG. 4 is a logical block diagram of an exemplary palmtop computer system in accordance with an embodiment of the present invention.

The digitizer 160 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (FIG. 4). In one implementation, there are roughly 256 different discrete levels of pressure that can be detected by the digitizer 106. Since the digitizers channels are sampled serially by the processor, the stroke spatial data are sampled "pseudo" simultaneously with the associated pressure data. The sampled data is then stored in a memory by the processor 101 (FIG. 4) for later analysis.

Figure 2B:
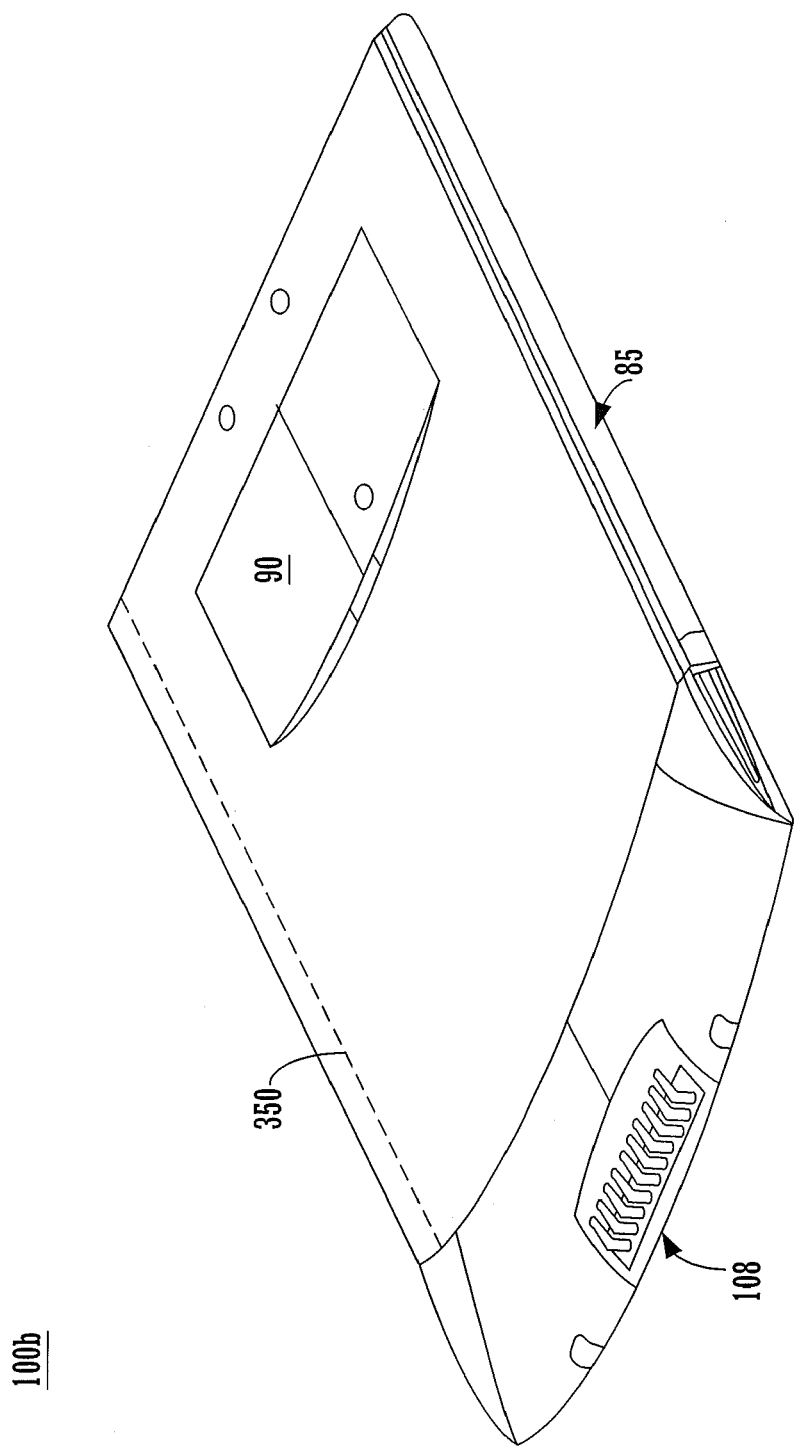
FIG. 2B is a bottom side perspective view of the palmtop computer system of FIG. 2A.

FIG. 2B illustrates the bottom side 100*b* of one embodiment of the palmtop computer system. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc. In FIG. 2B is also shown the stylus receiving slot or rail 350.

Figure 2C:
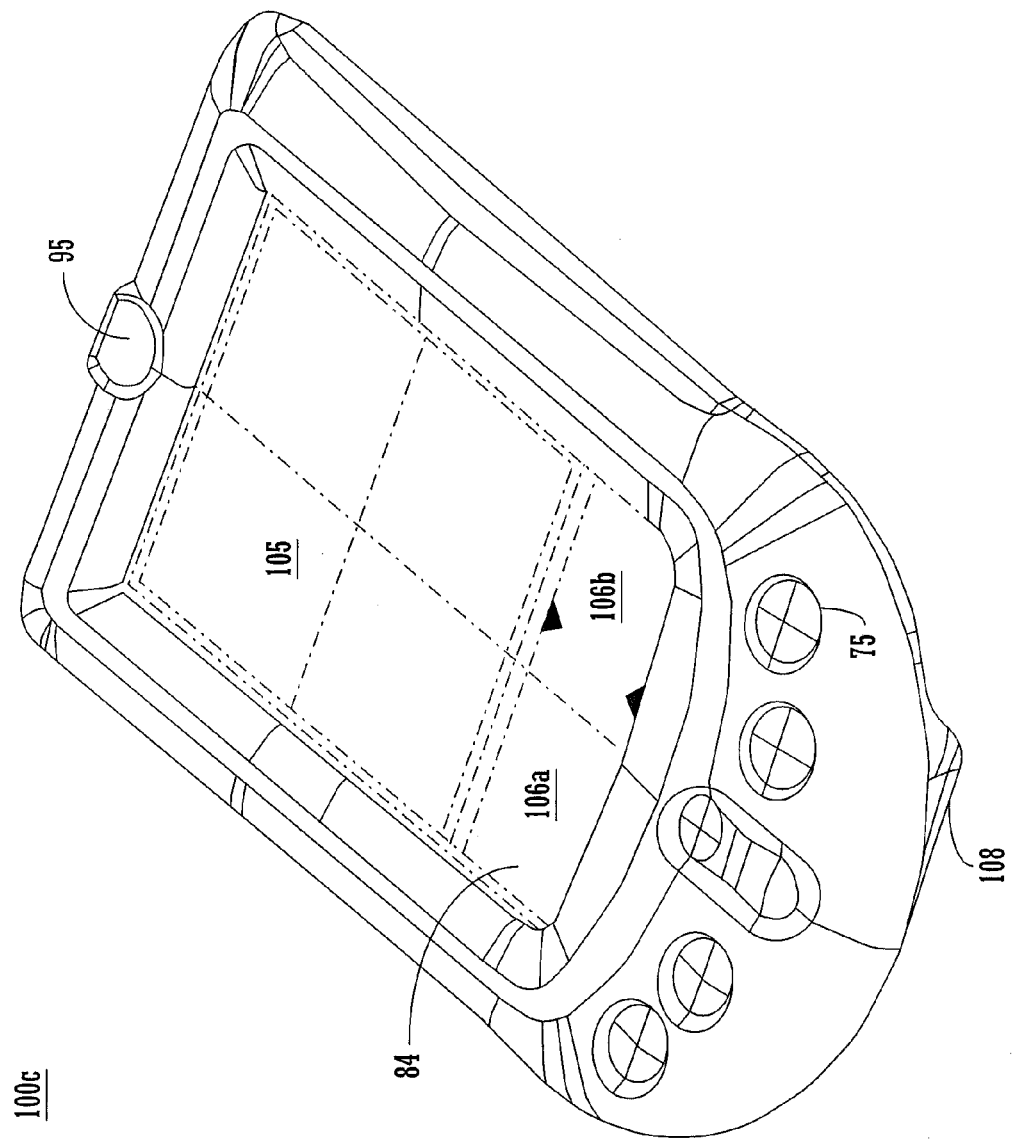
FIG. 2C is a perspective top view of another exemplary embodiment of a palmtop computer system.

FIG. 2C illustrates a front perspective view of another implementation 100*c* of the palmtop computer system. As shown, the flat central area is composed of a display screen area 105 and a thin silk screen layer material portion 84. Typically, the silk screen layer material portion 84 is opaque and may contain icons, buttons, images, etc., graphically printed thereon in addition to regions 106a and 106b. The display screen area 105 and portion 84 are disposed over a digitizer.

Figure 3:
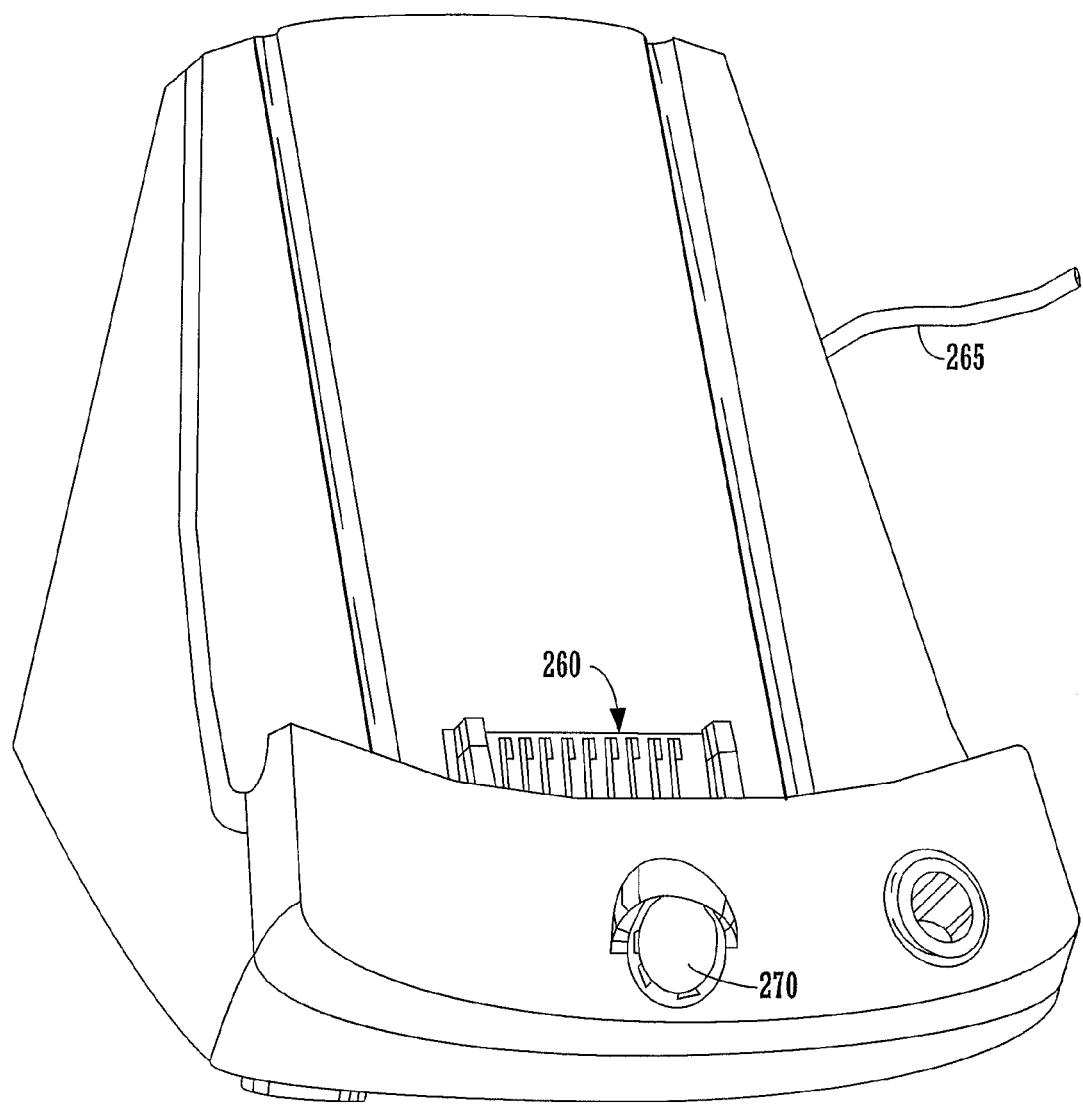
FIG. 3 is a perspective view of a cradle device for connecting a palmtop computer system to other systems via a communication interface.

FIG. 3 is a perspective illustration of one embodiment of the cradle 60 for receiving the palmtop computer system 100. In other embodiments, cradle 60 is not a stand-up device but is rather part of a cable connection between the palmtop computer system 100 and the desk top unit. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265. The two way communication can be used to synchronize data stored on the palmtop computer system and any host computer systems 58 and 56.

FIG. 4 illustrates circuitry of palmtop computer system 100, some of which can be implemented on a printed circuit board. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., thin profile removable memory) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 100 of FIG. 4 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In one embodiment, the display 105 utilizes color sequential scanning but could also utilize color filters with subpixels.

Signal communication device 108, also coupled to bus 99, can be a serial port for communicating with the cradle 60. Device 108 can also include an infrared communication port. Device 108 can also include a wireless network connection with an associated antenna. Protocols for a wireless network are based on various standards, including GSM, GPRS, CDPD, CDMA, Mobitex and 802.11(b).

Figure 5:
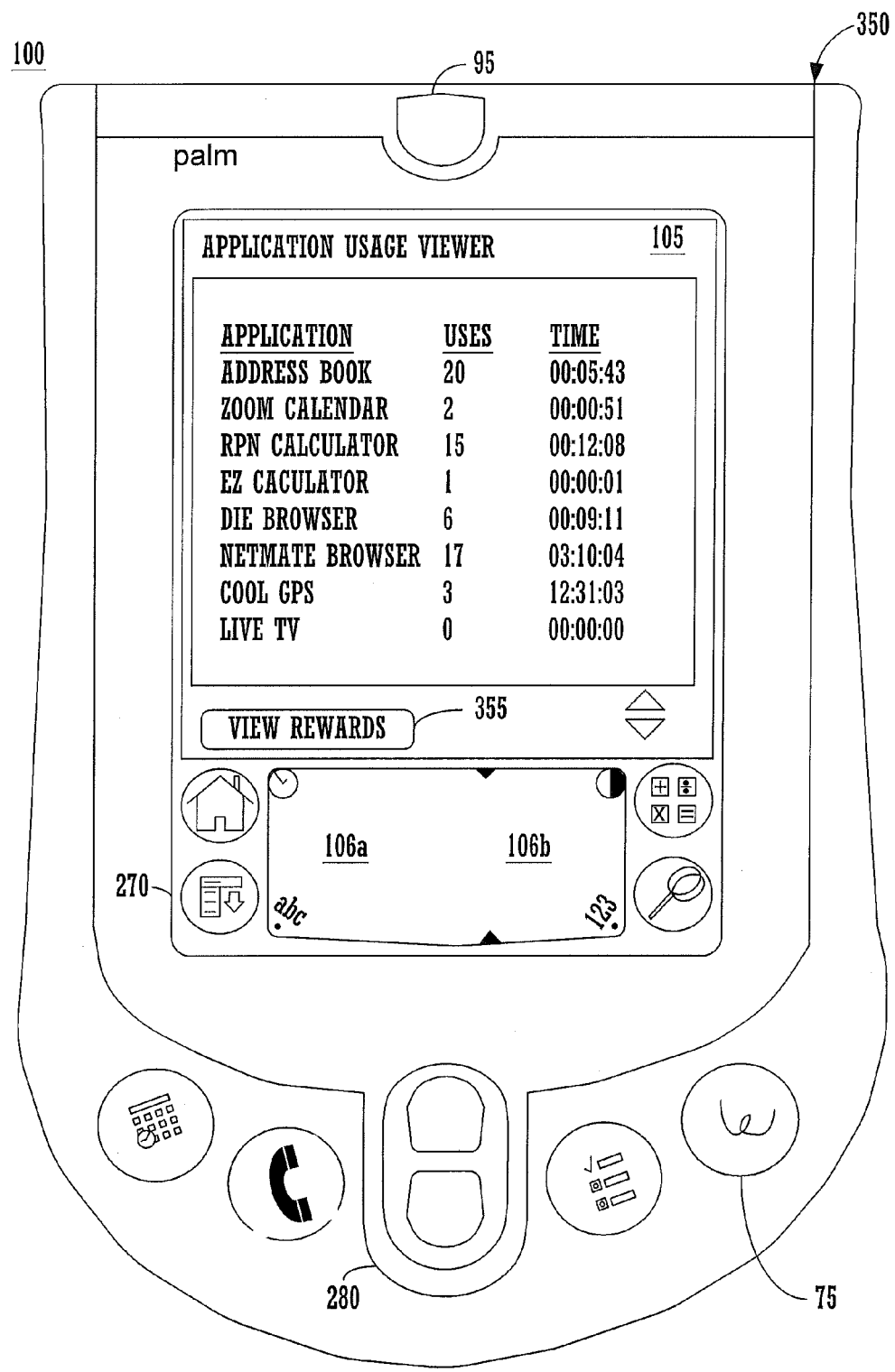
FIG. 5 is a front view of an exemplary palmtop computer system running the application usage viewer program.

FIG. 5 illustrates device 100 which contains several icons 270 printed on the silk screen layer. These icons, e.g., a home icon, a menu icon, a calculator icon and a finder icon, are user selectors and when tapped with the stylus these icons cause certain applications to be executed or invoke menu options within applications that are currently being displayed. Also shown is a scroll selector 280. Scroll selector 280 has an up button and a down button to cause list scrolling on the display 105.

Also shown are two regions of digitizer 106a and 106b. Region 106a is for receiving user stroke data (and pressure data) for alphabet characters, and typically not numeric characters, and region 106b is for receiving user stroke data (and pressure data) for numeric data, and typically not for alphabetic characters. Physical buttons 75 are also shown. Although different regions are shown for alphabetic and numeric characters, the device is also operable within a single region that recognizes both alphabetic and numeric characters. It is appreciated that, in one embodiment, the digitizer region 106a and 106b are separate from the display screen 105 and therefore does not consume any display area. Also shown in FIG. 5 is the position of the stylus receiving slot or rail 350. It is appreciated that while the stylus receiving slot or rail 350 is depicted on the right of the computer 100, it can also be deployed on the left or along the top edge or along the bottom edge.

Automatic Collection and Updating of Application Usage in Accordance with Present Invention The present invention allows users to vote for their favorite application simply by using it. Every time an application exits, usage information about that application is stored on the electronic device in a usage database, including the number of times each application is used as well as the total amount of time spent in the application. The data is uploaded to a host computer during a synchronization operation and then transmitted to a server. Alternatively, the electronic device can transmit directly to a server, and this is most easily accomplished with a wireless network connection. A web site can display the collected statistics.

The present invention's users will be able to track the applications they use on their handheld devices in order to find and delete unused programs or to be able to quickly find their favorites to transmit (also called "beam") to their friends. Potential users could view the statistics on the collected statistics web site to find the most popular application to download for their task. Developers could track the usage of their applications, to find out which versions are being used. Developers can also see which applications people are using.

FIG. 5 is a front view of an exemplary palmtop computer system 100 with an exemplary application usage viewer, displaying usage information of various applications within screen 105. It is appreciated that the present invention can be applied to any application, and the applications shown in the figure are only a few examples. In this example, number of times used and duration time of use are shown per application. The list of applications can be scrolled through. As an alternative, bar graphs could be used to convey the usage information in order to provide a visual queue as to usage. The information could be presented as a percentage of total number of times used or total amount of time for all applications. The information presented in the application usage viewer is obtained from the usage database that stores any usage information for all tracked applications residing on the portable electronic device.

The application usage viewer is designed to allow users to track statistics of their personal application usage. The viewer accesses the total usage list in the usage database to retrieve the information to display. The main user interface of the viewer consists of a table displaying the usage statistics. The viewer shows the application name with the number of times the application has been accessed, and/or the amount of time spent in each application. The view can be sorted by the most used application, by the least used application, or alphabetically by the application name. Application names are retrieved from the resource database using the creator code (an application's identifier number) stored in the usage database. If there is no name resource in an application, the database name is used. If the database for the given creator code cannot be found, it is assumed that the application has been deleted, and the corresponding record is deleted from the usage database.

A preferences dialog allows users to turn the monitoring of statistics on or off and also allows the usage data to be cleared from the device 100. A possible additional feature allows the user to elect to allow others to obtain his application usage data from the server, and this election can be done on the electronic device 100 and transmitted to the server, or can be elected by accessing the server via a web page. The application usage viewer can be a separate program or incorporated into the electronic device's operating system.

Figure 6:
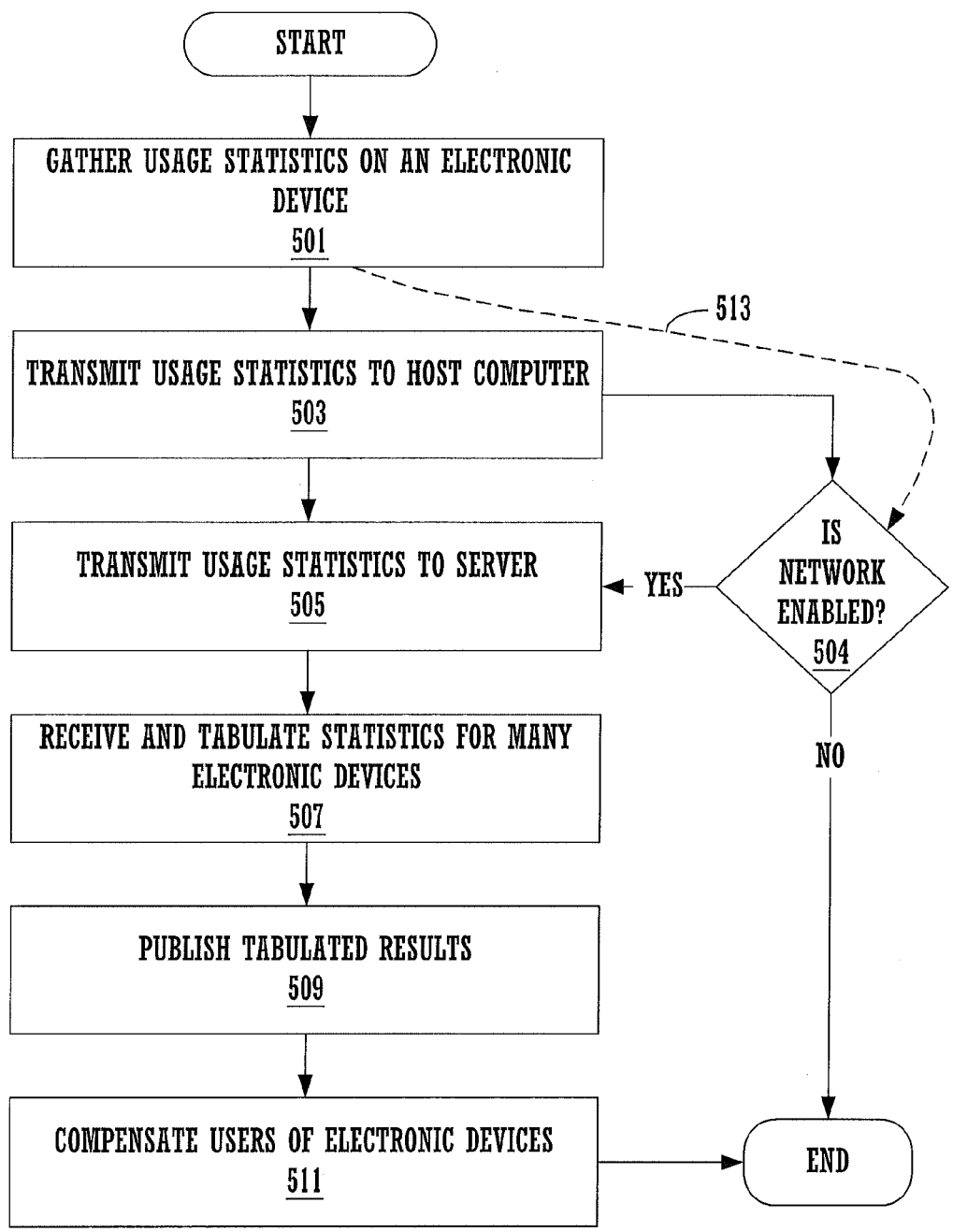
FIG. 6 is a flow diagram of a computer process in accordance with an embodiment of the present invention for the overall method of gathering, transmitting, tabulating, and publishing usage statistics.

The overall function of the present invention is shown in FIG. 6, and embodiments of each step are described in detail with other figures, below. The gathering and storing step 501 stores application usage into the usage database, and this step 501 takes place on the portable electronic device 100. The portable electronic device 100 regularly communicates with a host computer 56 and 58 for data synchronization purposes, and when synchronization occurs, it is a convenient time to transmit 503 the usage data from the portable electronic device 100 to the host computer 56 and 58. If the host computer 56 and 58 is able 504 to connect to the Internet 52 (or other appropriate network connection), the host computer 56 and 58 transfers 505 the usage statistics to a server 67. The server 67 performs a receiving and tabulation step 507, thereby incorporating newly received usage statistics into a database of previously received usage statistics. The server 67 publishes 509 the tabulated data, and compensates 511 the users (or owners) of the portable electronic devices that collected the data.

In an alternate embodiment, the portable electronic device 100 sends data directly to the server 67 without first sending it to a host computer 56 and 58, and this alternative is shown by skipping 513 the first transmitting step 503 and having the second transmitting step 505 performed by the portable electronic device 100 (if the network connection on the portable electronic device 100 is enabled 504). Certainly, the compensation step 511 is optional because users have many other reasons to participate in the collecting of usage data. The application usage viewer can include a button 355 to view any user rewards provided as compensation, as long as a server 67 downloads the compensation data to the portable electronic device 100 at some point. Compensation can also be accessed via the Internet, where each user can view his account.

The measurement of usage time is not easy because a user may run an application, and then without terminating the application, put the portable electronic device 100 aside, thereby causing anomalous usage times that are too large. The desired measurement would be restricted to times when the user is focused on the portable electronic device 100. To achieve better measurements, usage duration time does not include time when the portable electronic device 100 is turned off, whether by user command or auto-shutoff. Furthermore, only a fraction of the time between the last user interaction and auto-shutoff is included in the usage time measurement (a scale factor, such as 0.5 can be used). Since a portable electronic device 100 may be designed to not perform auto-shutoff while connected to an external power supply (i.e., not running on batteries), it would be advantageous to have two accumulations of usage duration: one for time the device 100 is running on batteries; and one for time when the device 100 is connected to an external power supply. Measuring usage duration is further complicated by interrupts, such as alarms that suspend the running of an application. While an application is suspended, its usage duration measurement does not increment. If the portable electronic device 100 is multitasking, the duration measurement could be active for only the application that has its window on top.

In order for the statistics to be relevant, steps must be taken to filter out invalid data. Erroneous data can also come from cheating. Votes (i.e. usage durations) that are suspiciously large should be discarded. Large numbers of votes from a particular IP address should also be discarded.

An important aspect of the present invention that resides on a portable electronic device is the recording of application usage. When each application exits, entries (also called a records or usage records) for that application in the usage database are retrieved and updated. In these records, the application count is incremented, and the amount of time spent in that application is added to the total already stored. In this embodiment that updates upon application exit, if the device 100 crashes while an application is running, the statistics for that application are not updated. Alternatively, the usage database could be updated periodically as an application runs, thereby avoiding losing data upon a crash. Generally, the statistics will accumulate for the life of the application on a particular portable electronic device.

Figure 7:
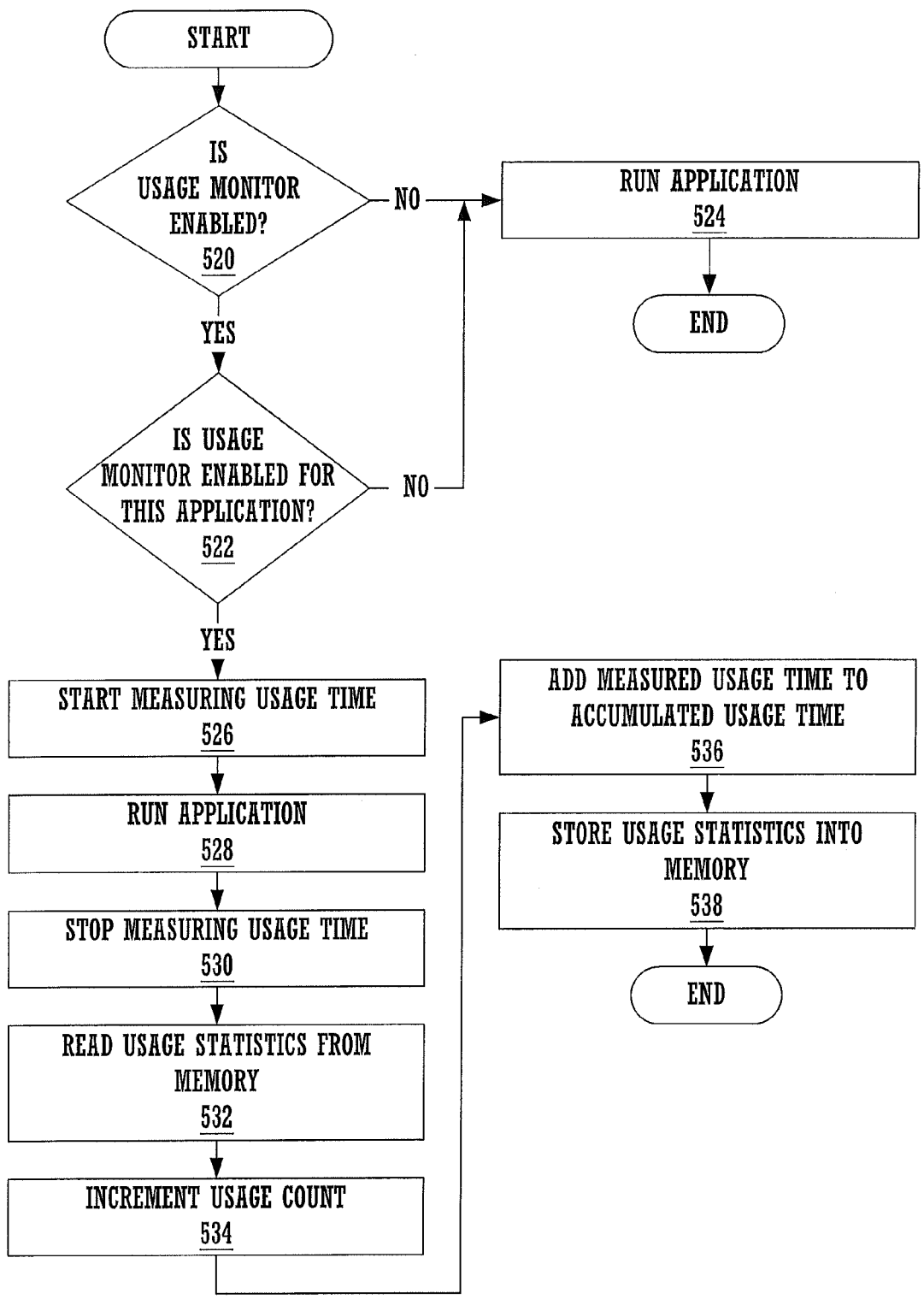
FIG. 7 is a flow diagram of a computer process in accordance with an embodiment of the present invention for gathering usage information on an electronic device.

FIG. 7 shows a flow diagram for an embodiment of the aspect of the invention that runs on the portable electronic device 100, describing the starting and running of an application program as well as the gathering of usage statistics. Hence, FIG. 7 corresponds to the gather step 501 in FIG. 6. The figure shows two decision points: (1) one based on whether usage monitoring is globally enabled 520, thereby allowing a user to completely disable usage statistics gathering; and (2) one based on whether usage monitoring is enabled for a particular application 522, thereby allowing a user to disable gathering of usage statistics for any application the user chooses. Both of these decisions 520 and 522 are based on preference data that are saved in the portable electronic device 100. If either status bit indicates the monitoring feature is not enabled, the corresponding application is run 524 without collecting usage statistics.

If gathering of usage statistics is not disabled, the measuring of usage time is started 526 before the application runs 528. When the application terminates, the measuring of usage time is stopped 530, thereby determining the amount of usage time. The usage statistics (i.e., one or more usage records) are read 532 from the usage database, the usage count is incremented 534, the measured usage time is added to the accumulated usage time 536, and the updated usage statistics for the application are stored 538 back into the usage database (i.e., as one or more modified usage records).

A particular embodiment for usage records is shown in FIGS. 12B and 12C. There are two categories of records in the usage database: (1) the total usage list, consisting of the total history of all applications on the device; and (2) the recent usage list, consisting of the usage history since the last time usage data was transmitted 505 or 507 from the personal electronic device. The data structure for both types of list consists of: (1) a usage record header structure 900, shown in FIG. 12B; and (2) a plurality of usage application data structures 920, shown in FIG. 12C. The usage application data structures (an example shown in FIG. 12C) generally include a unique identifier for an application (called, by some manufacturers, the "creator code", as shown in the figure). The usage application data structures many also include other information, such as language or version number. The total usage list is used for displaying the statistics on the portable electronic device 100, and is, therefore, used by a application usage viewer (an example shown in FIG. 5). The recent usage list contains statistics to be sent to servers. FIG. 12A shows the App Info Block 940, which is stored in the portable electronic device 100 and used to identify the portable electronic device 100.

Figure 8:
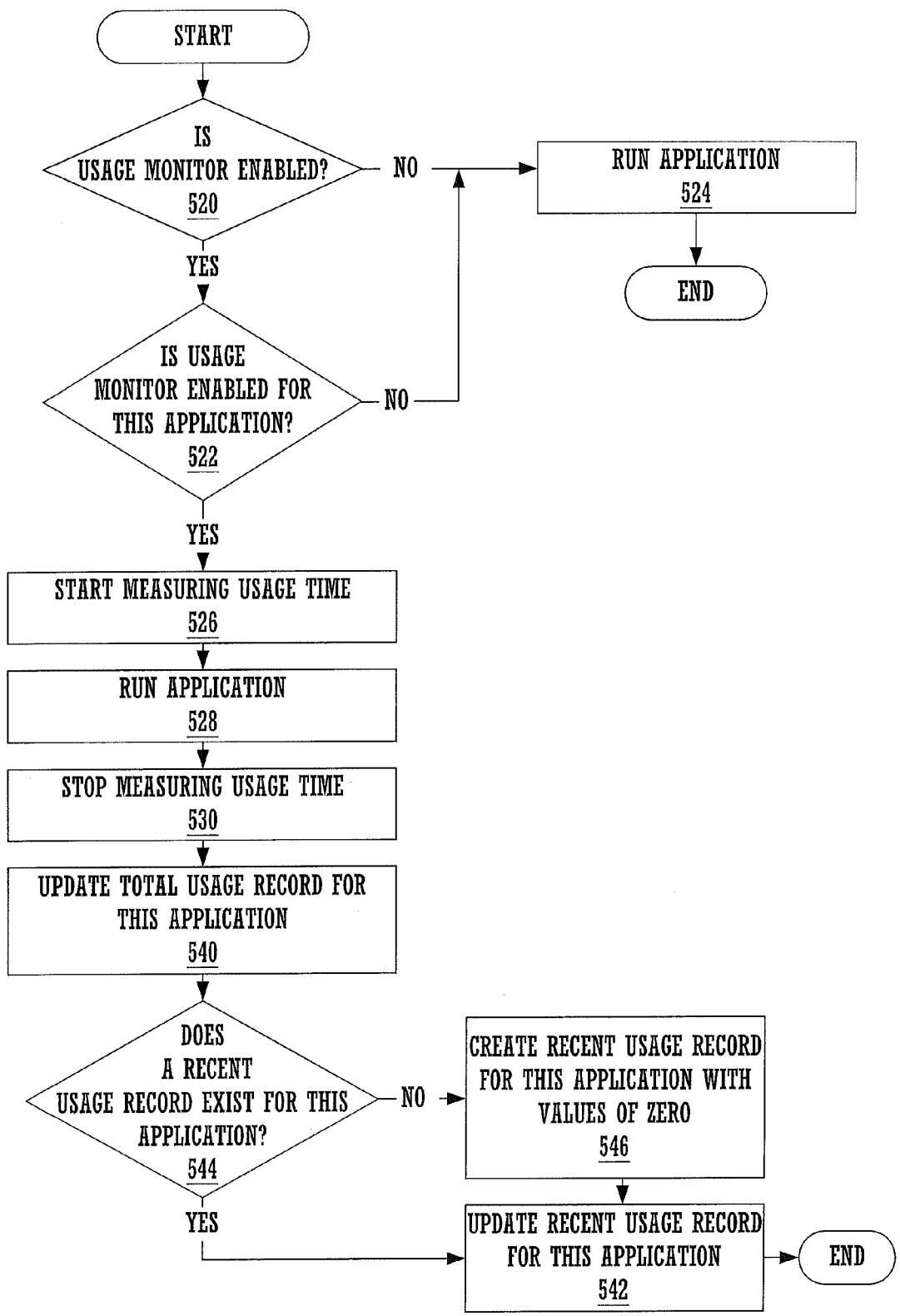
FIG. 8 is a flow diagram of a computer process in accordance with an embodiment of the present invention for gathering usage information on an electronic device, showing the creation of usage statistics records.

FIG. 8 shows a flow diagram for an alternate embodiment of the aspect of the invention that runs on the portable electronic device 100, describing the starting and running of an application program as well as the gather of usage statistics. Hence, FIG. 8 corresponds to the gather step 501 in FIG. 6. This figure shows the use of both the total usage list and the recent usage list. Once the application stops running and the measuring of usage time stops 530, the usage record in the total usage list corresponding to the application is updated 540. This update 540 can include updating the values for: number of times an application is run; amount of time an application is used (taking into account factors such as alarms, cradle time, and auto-shutdown); and number of operations completed by the user for an application (e.g., number of clicks, number of records accessed, number of email received, number of times a particular feature is used, etc.). Next, the corresponding record in the recent usage list is updated, but if 544 the recent usage record does not exist, it is created 546. A total usage record is created for an application when the application is loaded onto the portable electronic device 100. A recent usage record is created for an application the first time the application is run. Recent usage records are deleted once they have been successfully transmitted 503 or 505, which requires the creation of a new recent usage record the next time the application is run. Recent usage records are deleted once they have been successfully transmitted 503 or 505, ensuring that statistics are not duplicated due to retransmission.

Both the total usage and recent usage records are updated when an application exits. When an application is deleted, the corresponding application data structure is deleted from the portable electronic device 100. The deletion from the total usage list occurs the next time the application usage viewer is run. If the deleted application has a record in the recent usage list, the data will still be transmitted 503 or 505 at the next opportunity and then deleted. If the deleted application is later reinstalled, generally, its total statistics are started over at zero (unless downloaded from the host, if it is stored there).

Figure 9:
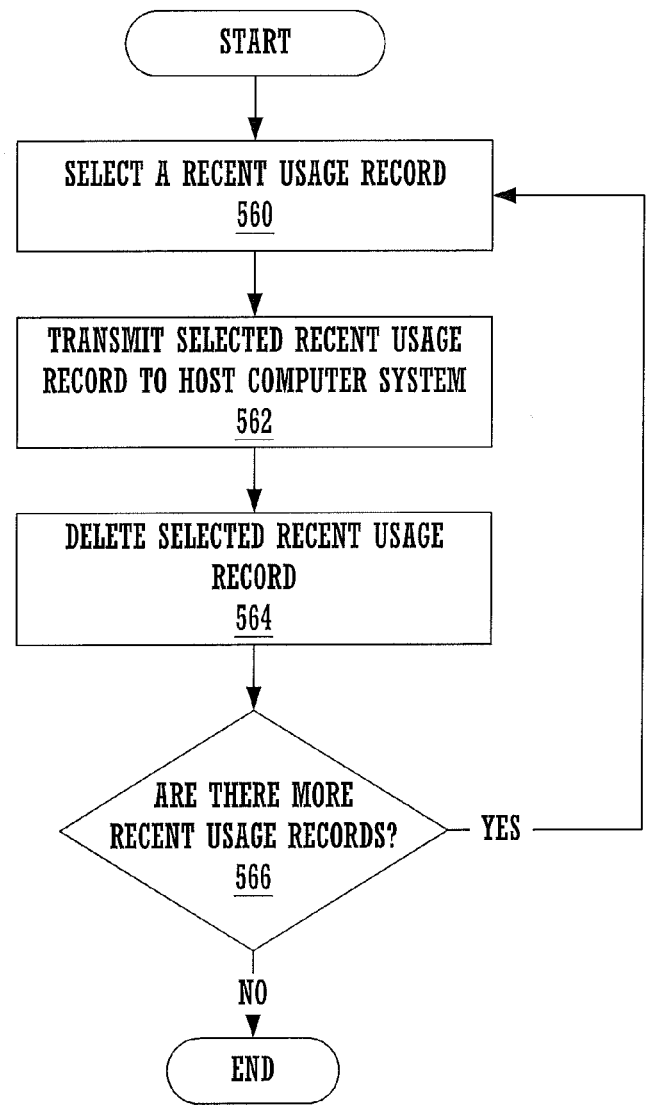
FIG. 9 is a flow diagram of a computer process in accordance with an embodiment of the present invention for transmitting collected usage statistics.

FIG. 9 summarizes the steps to transmit the usage information from the portable electronic device 100 to the host 56 and 58, and corresponds to the first transmission step 503 in FIG. 6. FIG. 9 shows how recent usage records are selected 560, transmitted 562, and then deleted 564, until 566 all the recent usage records have been transmitted. The form of the recent usage records can change to facilitate transmission; for example, they can be changed from a binary format to an XML format.

During a transmission 503 from the portable electronic device 100 to the host 56 and 58, the host 56 and 58 retrieves any recent usage records in the usage database from the portable electronic device 100 and merges the statistics with any data gathered from previous transmissions 503. The host 56 and 58 will then attempt to contact the server 67 to transmit the collected usage statistics. If the server cannot be contacted, the statistics are stored on the host 56 and 58.

In one embodiment, the usage data is sent to the server 67 in XML format, which allows for the protocol to be easily expanded as necessary. The XML can list the version of operating system that is being used, a unique ID to identify the portable electronic device 100 that is reporting statistics, and the list of application data structures. The host 56 and 58 can also gather the application database names and URLs of the used applications from the portable electronic device 100 to report to the server. The XML is then transmitted to the server, and the HTTP protocol maybe used for the transmission.

It is preferable to match application names with URLs (where they were downloaded, purchased, updated, etc), and the name and/or URL can be found, for example, by: (1) receiving them from the application; (2) getting them from an external service, such as an internet search site; (3) from a database on a server; or (4) having the user input them. A combination or these techniques can be used, and they can be applied in a preference order. If the name and/or URL is not available, they can be omitted.

As a specific example of name-URL matching, the names and URLs of applications can be cached in the preferences on the host. If a name is not found in the cache, a lookup on the portable electronic device 100 is done to retrieve the name. If no name is found on the portable electronic device 100, a application-unique identifier can be used (on the Palm electronic device, the application-unique identifier is called creator ID, and this is shown in the example of FIG. 12C).

The system may include a plurality of servers 67. To send updated data to the appropriate server 67, the host 56 and 58 will first look to see if a URL for the server 67 is stored in the preferences. If no URL is found or the stored URL is unavailable, a request will be sent to a default server 67 to determine the correct address (i.e., the appropriate server) to send the data. The default server will reply with the URL for the appropriate server. This will enable the server to change location with minimal disruption. The XML data is then sent to the server, which responds with a confirmation reply. The URL is then stored in the preferences file on the host. After a successful transmission to the server, the saved usage data on the host are deleted, as well as the recent usage records on the portable electronic device 100.

Figure 10:
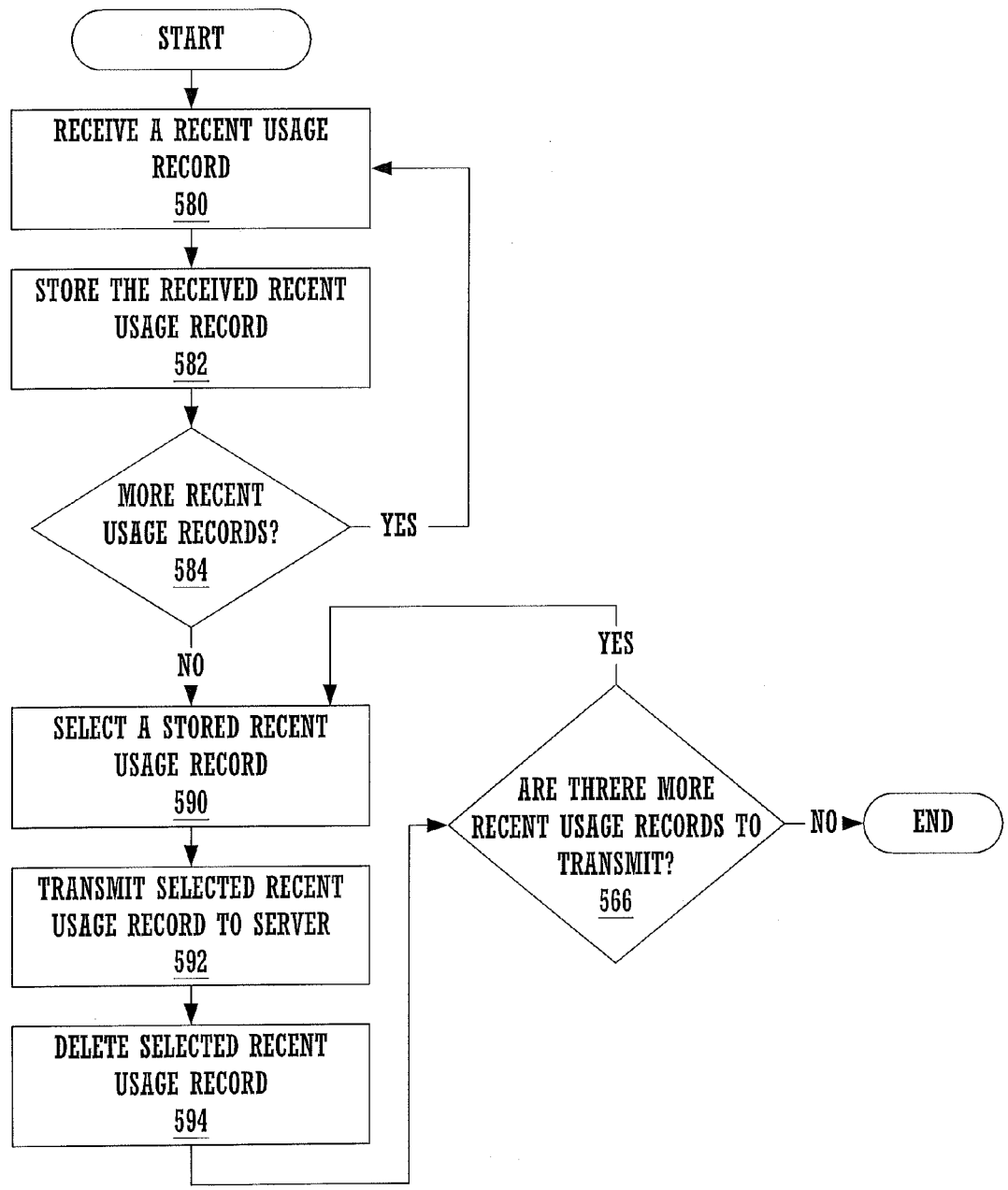
FIG. 10 is a flow diagram of a computer process in accordance with an embodiment of the present invention for receiving and retransmitting usage statistics.

FIG. 10 summarizes the steps to transmit the usage information from the host 56 and 58 to the server 67, and corresponds to the second transmission step 505 in FIG. 6. FIG. 10 shows how recent usage records are received 580 and stored 582 until 584 there are no more records to receive. The stored recent usage records are then transmitted from the host 56 and 58 to the server 67 by selecting 590, transmitting 592, and deleting 594 the records until 596 all the recent usage records have been transmitted. The form of the recent usage records can change to facilitate transmission; for example, they can be changed from a binary format to an XML format.

The server 67 (or group of servers 67) has two functions: (1) it handles requests from hosts (or from portable electronic devices 100 if they can directly transmit) to update a central usage statistics database, and (2) displays the information contained in the database in a coherent manner. The server 67 will parse the data (possibly in XML format) sent by the host 56 and 58 and merge the statistics with data already on the server (possibly stored in XML format).

The collection of usage data can be segmented into voting periods, such that each portable electronic device 100 transmits is usage data to the server at least once per voting period. A typical voting period could be one week. A possible voting period could begin on Monday at 12:00 am and last until Sunday at 11:59 pm. Preferably, transmissions include the time and date of the transmission, thereby allowing the server to allocate the usage across one or more voting periods. The server may lump transmissions received during a voting period into that voting period's statistics, or, the server may divide the statistics amongst voting periods based on the number of voting periods that have passed since the last transmission.

The transmission of usage data can be selected to occur: (1) at random times; (2) during a low usage time, such as the middle of the night; (3) when an application terminates; (4) when a predetermined amount of usage has occurred, such as one hour of use; (5) a set time of day; (6) when a predetermined number of application uses has occurred; (7) once per voting period; or (8) a set number of times during a voting period.

The usage statistics are retrieved and parsed into a database running on a server 67. If a new user or application is received, a new row is created in the appropriate database table. If the statistics for an application already exist for the voting period, the row is updated, otherwise a new row is added to the table. If a new application does not already have a URL associated with it, a web search is done.

The web interface to the central usage statistics database displays the total statistics and a breakdown of statistics by voting period. The name, URL, number of users, count, total time spent as well as the average time per use (average time per use is also called "stickiness") are displayed for each application. The statistics can be sorted in alphabetical order by application name, or in ascending order according to number of users or the usage statistics. Each application has a history page which displays graphs of the usage over time.

If a portable electronic device 100 user has selected to identify himself (e.g., with a user name and password) to the server, his statistics are accessible from the web page. As one possible alternative to listing exact statistics, the user's page can display the list of applications divided into three categories: heavy, moderate and light usage. The categories are defined relative to the application with the largest "stickiness." For example, heavy usage can be defined as applications that have a stickiness greater than half of the most used application. Light usage can correspondingly defined as less than one sixth of the largest value, and moderate usage is the rest of the applications. The usage statistics can be presented in a variety of ways, and this is an illustrative example. Typically, there would also be a web page that shows statistics of the versions of operating system that are used on the portable electronic devices 100.

The server 67 function can be implemented using the PHP XML parser to handle requests from the host, storing the data in a MySQL database. The web pages are generated using PHP to retrieve statistics from the database.

Figure 11:
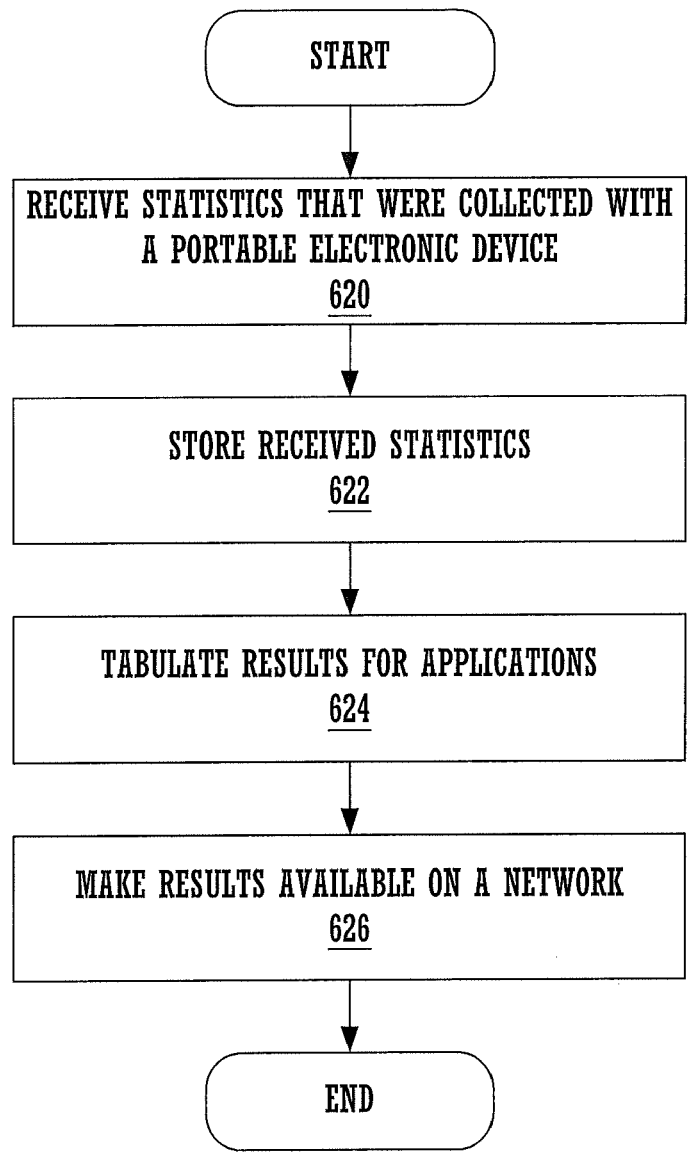
FIG. 11 is a flow diagram of a computer process in accordance with an embodiment of the present invention for receiving and publishing usage statistics.

FIG. 11 summarizes the steps to transmit receive usage information at the server 67, and corresponds to the receive and tabulate step 507 and the publish step 509 in FIG. 6. FIG. 11 shows how usage statistics (i.e., recent usage records, in some form) are received 620, stored 622, tabulated 624, and published 626. As described above, tabulation can be in the form of incorporation into a database. Also, publishing can be in the form of querying a database and formatting the database response as a web page.

The preferred embodiment of the present invention, automatic collection and updating of application usage, is thus described. While the present invention has been described in particular embodiments, it should be appreciated that the present invention should not be construed as limited by such embodiments, but rather construed according to the below claims.

What is claimed is:

1. In an electronic device having a plurality of application programs, a method of monitoring usage comprising the steps of:
   a) gathering usage statistics of said application programs, said usage statistics comprising: measurements denoting a duration of usage when said electronic device is powered by batteries; measurements denoting a duration of usage when said electronic device is powered by an external source of power; measurements denoting a duration of usage when an auto-shutoff of said electronic device occurs, said measurements for denoting a duration of usage adjusted by a predetermined scale factor; and measurements denoting a duration of usage of said application programs when an interrupt occurs;
   b) storing said usage statistics; and
   c) automatically transmitting said stored usage statistics to a server on a regular basis, whereby said server tabulates said usage statistics;
   wherein said gathering step further comprises measuring duration of application usage, and when an auto-shutoff occurs, includes a predetermined fraction of the time from a last user interaction to said auto-shutoff in said measured duration.

2. A method as described in claim 1 wherein said storing step comprises, for at least one said application program, storing of:
   i) duration of usage since last said transmitting step occurred;
   ii) number of times used since last said transmitting step occurred;
   iii) total duration usage; and
   iv) total number of times used.

3. A method as described in claim 1 and further comprising the step of displaying said stored usage statistics on a display of said electronic device.

4. A method as described in claim 1 wherein said gathering step further comprises measuring duration of usage of at least one said application program and does not include time when said electronic device is turned off.

5. A method as described in claim 1 wherein said gathering step further comprises:
   i) measuring, for at least one said application program, a first duration of usage while said electronic device is running on batteries; and
   ii) measuring, for said at least one application program, a second duration of usage while said electronic device is connected to an external source of power.

6. A method as described in claim 5 wherein said measuring steps do not include time when an interrupt pauses use of said at least one application program.

7. A method as described in claim 1 wherein said electronic device is a palm-sized computer system.

8. A method as described in claim 1 wherein said electronic device is a wireless telephone.

9. In an personal digital assistant having a plurality of application programs, a method of monitoring usage comprising the steps of:
   a) gathering usage statistics of said application programs, said usage statistics comprising: measurements denoting a duration of usage when said personal digital assistant is powered by batteries; measurements denoting a duration of usage when said personal digital assistant is powered by an external source of power; measurements denoting a duration of usage when an auto-shutoff of said personal digital assistant occurs, said measurements for denoting a duration of usage adjusted by a predetermined scale factor; and measurements denoting a duration of usage of said application programs when an interrupt occurs;

b) storing said usage statistics; and c) automatically transmitting said stored usage statistics to a server on a regular basis, whereby said server tabulates said usage statistics; and wherein said gathering step further comprises measuring duration of application usage, and when an auto-shutoff occurs, includes a predetermined fraction of the time from a last user interaction to said auto-shutoff in said measured duration.

10. A method as described in claim 9 wherein said storing step comprises, for at least one said application program, storing of:
   i) duration of usage since last said transmitting step occurred;
   ii) number of times used since last said transmitting step occurred;
   iii) total duration usage; and
   iv) total number of times used.

11. A method as described in claim 9 and further comprising the step displaying said stored usage statistics on a display of said personal digital assistant.

12. A method as described in claim 9 wherein said gathering step further comprises:
   i) measuring, for at least one said application program, a first duration of usage while said electronic device is running on batteries; and
   ii) measuring, for said at least one application program, a second duration of usage while said electronic device is connected to an external source of power.

13. A method as described in claim 9 wherein said personal digital assistant is a palm-sized computer system.

14. A method as described in claim 9 wherein said personal digital assistant is a wireless telephone.

15. In an electronic device comprising a processor coupled to a bus, a display coupled to said bus and a memory coupled to said bus, said memory having a database of records of different categories and instructions implementing a method of displaying information comprising the steps of:
   a) gathering usage statistics of said application programs, said usage statistics comprising: measurements denoting a duration of usage when said electronic device is powered by batteries; measurements denoting a duration of usage when said electronic device is powered by an external source of power; measurements denoting a duration of usage when an auto-shutoff of said electronic device occurs, said measurements for denoting a duration of usage adjusted by a predetermined scale factor; and measurements denoting a duration of usage of said application programs when an interrupt occurs;
   b) storing said usage statistics; and
   c) automatically transmitting said stored usage statistics to a server on a regular basis, whereby said server tabulates said usage statistics; and
   wherein said gathering step further comprises measuring duration of application usage, and when an auto-shutoff occurs, includes a predetermined fraction of the time from a last user interaction to said auto-shutoff in said measured duration.

16. A method as described in claim 15 wherein said storing step comprises, for at least one said application program, storing of:
   i) duration of usage since last said transmitting step occurred;
   ii) number of times used since last said transmitting step occurred;
   iii) total duration usage; and
   iv) total number of times used.

17. A method as described in claim 15 and further comprising the step of displaying said stored usage statistics on a display of said electronic device.

18. A method as described in claim 15 wherein said gathering step further comprises:
   i) measuring, for at least one said application program, a first duration of usage while said electronic device is running on batteries; and
   ii) measuring, for said at least one application program, a second duration of usage while said electronic device is connected to an external source of power.

19. A method as described in claim 15 wherein said electronic device is a palm-sized computer system.

20. A method as described in claim 15 wherein said electronic device is a wireless telephone.

21. In a system comprising a plurality of electronic devices having application programs and a computer server, a method of monitoring usage comprising the steps of:
   a) gathering usage statistics of said application programs, said usage statistics comprising: measurements denoting a duration of usage when said electronic device is powered by batteries; measurements denoting a duration of usage when said electronic device is powered by an external source of power; measurements denoting a duration of usage when an auto-shutoff of said electronic device occurs, said measurements for denoting a duration of usage adjusted by a predetermined scale factor; and measurements denoting a duration of usage of said application programs when an interrupt occurs;
   b) storing said usage statistics;
   c) automatically transmitting said stored usage statistics to a server on a regular basis; and
   d) tabulating said transmitted usage statistics; and
   wherein said gathering step further comprises measuring duration of application usage, and when an auto-shutoff occurs, includes a predetermined fraction of the time from a last user interaction to said auto-shutoff in said measured duration.

22. A method as described in claim 21, the system further comprising host computer, and further comprising the step of transmitting said stored usage statistics to said host computer before transmitting said stored usage statistics to said server.

23. A method as described in claim 21 and further comprising the step of publishing said tabulated usage statistics on the Internet.

24. A method as described in claim 21 and further comprising the step of crediting value to an account corresponding to at least one of said electronic devices.

25. In one or more computer servers, a method of collecting usage statistics comprising the steps of:
   a) automatically receiving usage statistics for at least one application program on a regular basis, said usage statistics having been gathered from electronic devices, wherein said usage statistics comprise: measurements denoting a duration of usage when said electronic device is powered by batteries; measurements denoting a duration of usage when said electronic device is powered by an external source of power; measurements denoting a duration of usage when an auto-shutoff of said electronic device occurs, said measurements for denoting a duration of usage adjusted by a predetermined scale factor and measurements denoting a duration of usage of said at least one application program when an interrupt occurs;

b) tabulating said received usage statistics; and c) publishing said tabulated usage statistics; and wherein said gathering step further comprises measuring duration of application usage, and when an auto-shutoff occurs, includes a predetermined fraction of the time from a last user interaction to said auto-shutoff in said measured duration.

26. A method as described in claim 25 and further comprising the step of crediting value to an account corresponding to at least one of said electronic devices.

27. A method as described in claim 25 and further comprising the step of storing said tabulated usage results in a database that can be queried.

28. A method as described in claim 27 wherein said publishing step comprises:

a) receiving a query request;

b) applying said query to said database;

c) receiving query results from said database;

d) formatting said results; and e) transmitting said formatted results.

* * * * *